H. ZIMMERMAN.
SHOCK GATHERER.
APPLICATION FILED JULY 8, 1911.
1,075,748.
Patented Oct. 14, 1913.
3 SHEETS—SHEET 2.
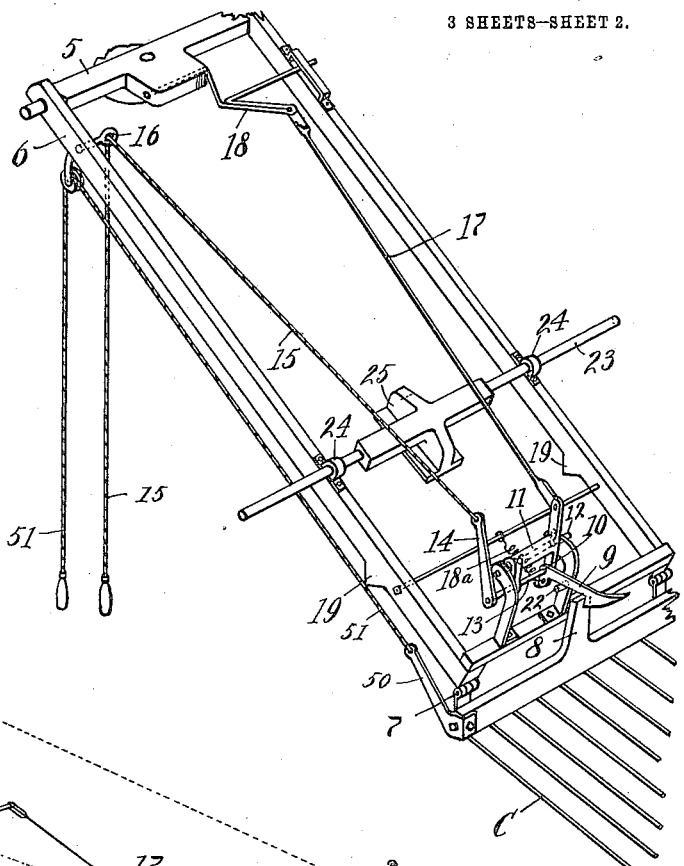
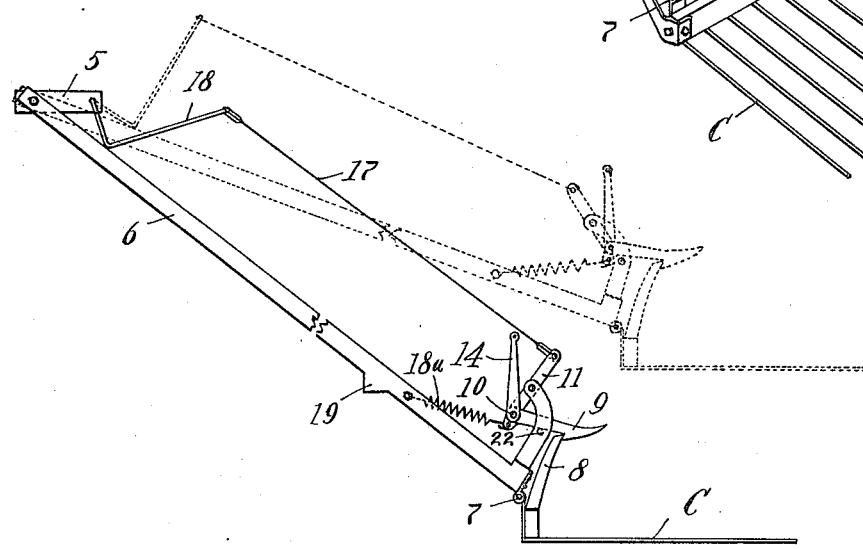

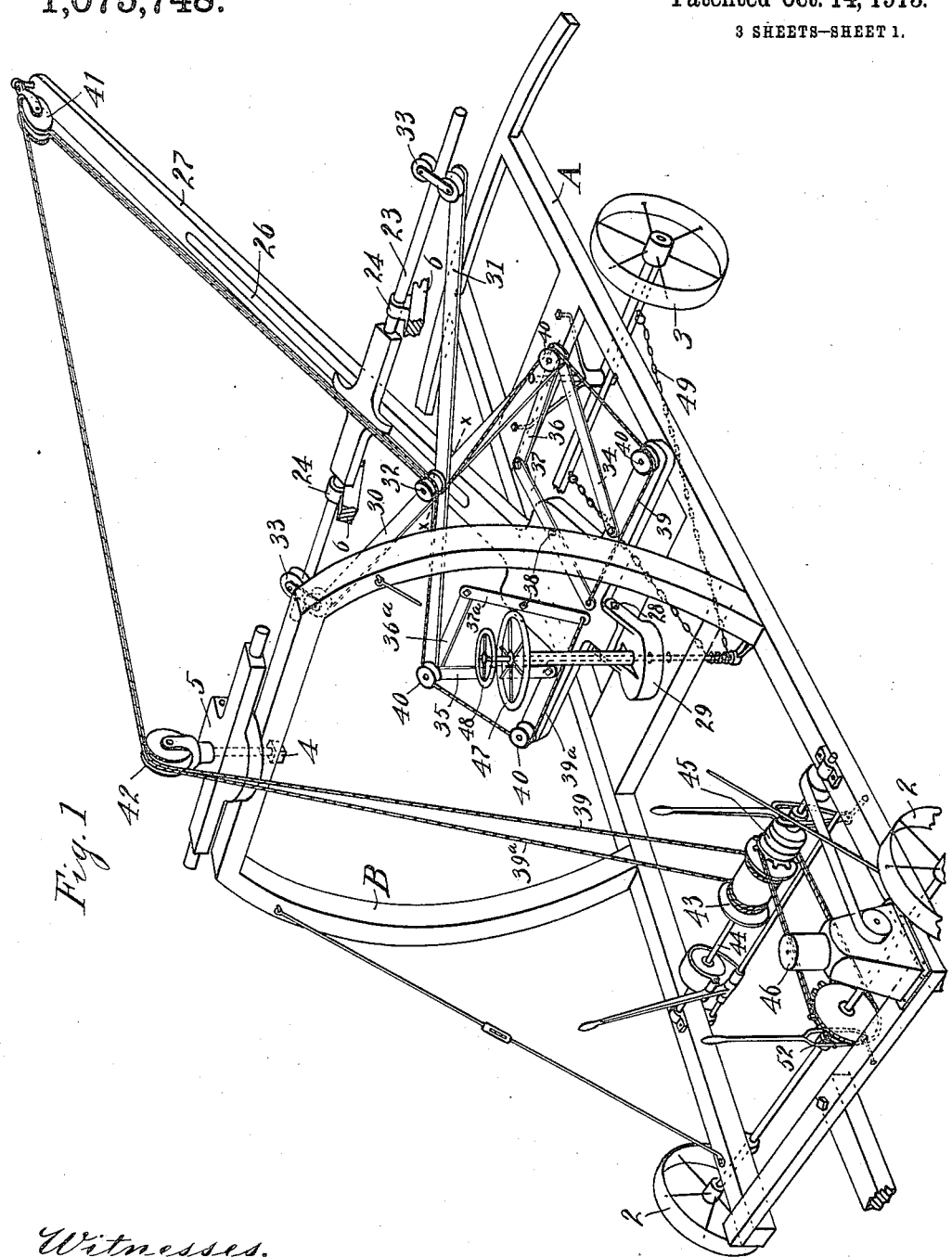

H. ZIMMERMAN.
SHOCK GATHERER.
APPLICATION FILED JULY 8, 1911.

1,075,748.

Patented Oct. 14, 1913.
3 SHEETS—SHEET 3.

Witnesses,
George Voelker
J. Swanson.

Inventor,
Harry Zimmerman
by Lothrop & Johnson
his Attorneys.

UNITED STATES PATENT OFFICE.

HARRY ZIMMERMAN, OF ST. PAUL, MINNESOTA.

SHOCK-GATHERER.

1,075,748.  Specification of Letters Patent.  Patented Oct. 14, 1913.

Application filed July 8, 1911. Serial No. 637,468.

*To all whom it may concern:*

Be it known that I, HARRY ZIMMERMAN, a citizen of the United States, residing at St. Paul, in the county of Ramsey and State of Minnesota, have invented certain new and useful Improvements in Shock-Gatherers, of which the following is a specification.

My invention relates to improvements in machines designed for gathering shocks and for similar uses and consists in the particular features of construction and combination hereinafter described and claimed.

Figure 4:
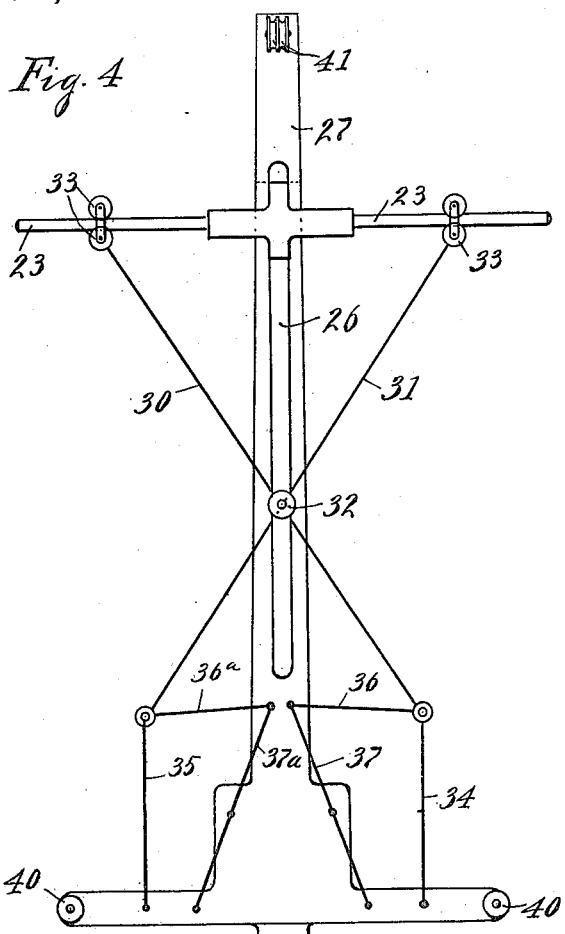
Figure 6:
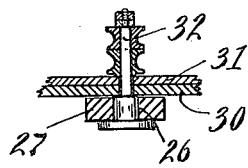
Figure 5:
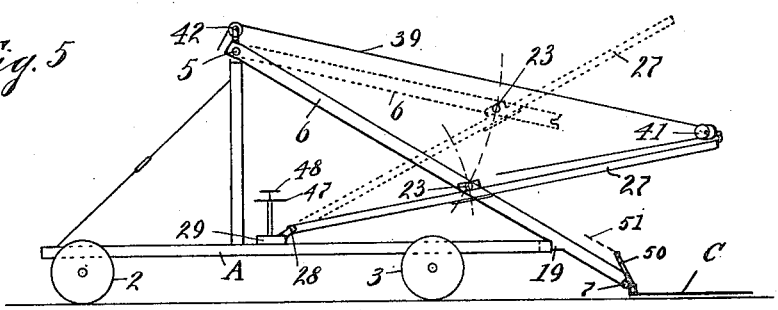

In the accompanying drawings forming part of this specification, Figure 1 is a perspective view of the apparatus with a portion of the shock gatherer removed; Fig. 2 is a perspective view of the portion of the shock gatherer removed from Fig. 1; Fig. 3 is a conventional view illustrating the controlling mechanism for the shock gathering forks; Fig. 4 is a conventional top view of the machine; Fig. 5 is a conventional side view; and Fig. 6 is a section on line $x$—$x$ of Fig. 1.

In the drawings A represents the framework of the apparatus upon wheels 2 and 3. Supported upon the framework is a bracket B, in the upper end of which is a vertical pin 4 forming a pivotal support for the upper cross bar 5 of the gatherer. The gatherer is made up of side bars 6 journaled at their upper ends upon the outer ends of the cross bar 5, and at their lower ends supporting the gathering fork C through the medium of the hinges 7. To hold the fork in fixed position with reference to the gatherer frame I provide a lug 8 extending upwardly from the inner end of the fork with which engages a trip 9 having fulcrum support 10 upon a bracket 11, which in turn has fulcrum support 12 upon the gathering frame. Connected with the inner end of the trip 9 by the shaft 13 is an arm 14 with which is connected a cord 15 having slidable support 16 upon the gathering frame. Thus by pulling upon the cord 15 the trip 9 is turned on its pivot out of engagement with the lug. Through the medium of the handle 18, and the rod 17 connecting said handle with the upwardly extending end of the bracket 11, the bracket 11 may be turned to carry the trip toward and from the lug. The trip is normally held in locking engagement with the lug by the spring 18ᵃ. It will be evident that by means of the rod 17 and arm 18 the bracket 11 can be turned to draw the trip rearwardly against the lug 8 to tighten the gripping action of the trip upon said lug. The gathering frame carries a stop 19 adapted to abut against the forward end of the framework as shown in Fig. 5, when the gathering frame is lowered. The supporting framework for the bracket 11 carries an inwardly extending stop 22 to limit the downward movement of the trip 9. To restore the fork to normal position after being dumped I employ the arm 50 and cable 51.

The cross bar 23 has journal support 24 upon the gatherer frame and is formed with a central guide 25 which travels in the slot 26 in the beam 27. The beam 27 has hinge support 28 upon the base plate 29 rotatably mounted upon the framework. For the purpose of lifting the beam 20 upon its hinge support and sliding the free end of the gatherer upwardly upon said beam I provide toggle arms 30 and 31 having fulcrum connection 32 slidable in the slot 26. The free ends of the toggle arms carry anti-friction rollers 33 slidable upon the cross bar 23. The lower ends of the toggle arms are connected by links 34 and 35 to the base of the beam. Supplemental links 36 and 36ᵃ connect the lower ends of the toggle arms 30 and 31, respectively, with the forward ends of bars 37 and 37ᵃ, said bars each having fulcrum support 38 upon the lower end of the beam 27. Cables 39 and 39ᵃ are connected with the free lower ends of the bars 37 and 37ᵃ and run over the idlers to a sheave 41 on the free end of the beam 27 and thence over the idler 42 to a windlass 43 mounted upon a shaft 44 journaled in the framework of the machine. The windlass may be thrown into operative engagement with the engine 46 through the medium of the clutch mechanism 45, and the drive wheels 2 similarly thrown into operative relation with the engine by the clutch mechanism 52.

It will thus be evident that by throwing the windlass into operative connection with the engine to wind up the cables 39 and 39ᵃ the beam 27 will be lifted upon its hinge and the free end of the gatherer frame moved upwardly upon said beam by means of the toggle mechanism which engages with the outer ends of the cross bar 23 carried upon the gatherer frame. The beam 27 and its supported gatherer frame may then be swung horizontally by means of the handle 47 carried by the rotatable base 29. A second handle 48 has chain connection 49 with the front steering wheels.

While the beam 27 with the gatherer is being raised and the beam swung up upon its pivot the fork may be held fixed in relation with the gatherer by the trip 9 causing the shock to be supported upon the fork. When the beam has been swung the desired amount a pull upon the cable 15 will turn the trip into releasing position, and allow the fork to drop, depositing the shock upon the ground. It will be evident that when the fork is released and drops to deposit the shock the inwardly extending arm 50 will be turned into upwardly extending position. Thereafter a pull upon the cable 51 will draw the arm 50 back into the position shown in Fig. 2 to allow the trip 9 to engage with the lug 8.

I claim as my invention:

1. In an apparatus of the class described, the combination with the framework and carrying wheels, of a beam having rotatable hinge support upon said framework to swing in horizontal and vertical planes, a pivotally supported gatherer frame slidable upon said beam, a gathering fork having hinge support upon said gatherer frame, and means for sliding said gatherer frame outwardly upon said beam and releasing said fork.

2. In an apparatus of the class described, the combination with the framework carried upon carrying wheels, of a beam supported upon said framework to swing in horizontal and vertical planes, a similarly supported gatherer frame slidable upon said beam, a gathering fork having hinge support upon the outer end of said gatherer frame, means for holding said fork in extended position as said beam is horizontally rotated upon its support, and manually actuated means for releasing said fork.

3. An apparatus of the class described, comprising a framework supported upon carrying wheels, a beam having hinged rotatable support upon said framework whereby to swing in horizontal and vertical planes, a gatherer frame slidable upon said beam and supported to swing in horizontal and vertical planes with said beam, a fork carried by said gatherer frame, means for normally locking said fork in extended position, and means for simultaneously raising said beam and sliding said gatherer frame outwardly thereon.

4. In an apparatus of the class described, the combination with a frame supported upon carrying wheels, a beam having hinge rotatable support upon said frame, an upwardly extending framework portion, a gatherer frame pivotally supported at one end upon said upwardly extending framework portion and having slidable support upon said beam, a gathering fork carried by the free end of said gatherer frame, and means for simultaneously raising said beam and sliding the free end of said gatherer frame outwardly thereon for the purpose set forth.

5. In an apparatus of the class described the combination with its framework, carrying wheels and driving mechanism, of an upwardly extending portion carried by said framework, a beam rotatably supported upon said framework, a gatherer frame having pivotal support at one end upon the upward extension of said framework, a cross bar carried by said gatherer frame and slidably supported on said beam, a fork carried by the free end of said gatherer frame, means for normally locking said fork in extending position, and means operated from the driving mechanism of the machine for simultaneously raising said beam and sliding the free end of said gatherer frame outwardly thereon.

In testimony whereof I affix my signature in presence of two witnesses.

HARRY ZIMMERMAN.

Witnesses:
H. SWANSON,
GEORGE VOELKER.

---

Copies of this patent may be obtained for five cents each, by addressing the "Commissioner of Patents, Washington, D. C."